(12) United States Patent
Whitty

(10) Patent No.: US 6,757,112 B1
(45) Date of Patent: Jun. 29, 2004

(54) LENS ASSEMBLY AND METHOD FOR ITS PREPARATION

(75) Inventor: James R. Whitty, Midland (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/278,326

(22) Filed: Oct. 22, 2002

(51) Int. Cl.[7] .................................................. G02B 7/02
(52) U.S. Cl. ....................................................... 359/819
(58) Field of Search ................................ 359/819, 820, 359/704

(56) References Cited

U.S. PATENT DOCUMENTS 5,644,425 A * 7/1997 Palmer ........................ 359/409
5,754,274 A * 5/1998 Nordquist .................... 351/223
6,072,634 A * 6/2000 Broome et al. .............. 359/637
6,122,114 A * 9/2000 Sudo et al. .................. 359/819
6,222,610 B1 * 4/2001 Hagiwara et al. ............. 355/30

* cited by examiner

Primary Examiner—Ricky Mack
(74) Attorney, Agent, or Firm—William C. Schubert

(57) ABSTRACT

A lens assembly is prepared by placing a first lens into an interior of a lens housing with a first side of the lens contacting a seat in a side wall of the lens housing. An annular first retainer is placed into the lens housing contacting a second side of the first lens. A second lens is placed into the lens housing with a first side of the second lens contacting the annular first retainer. An annular second retainer is placed into the lens housing contacting the second side of the second lens. The annular first retainer and the annular second retainer are affixed to the side wall with respective metallic solder or weld joints. The first lens and the second lens are not affixed to the inner side wall.

19 Claims, 2 Drawing Sheets

LENS ASSEMBLY AND METHOD FOR ITS PREPARATION

This invention relates to a lens assembly and a method for its preparation, and more particularly to such a lens assembly that is stable and is accomplished in a relatively low volume.

BACKGROUND OF THE INVENTION

Optical elements such as lenses are assembled together to form an optical system. In one common form of the optical system, the individual lenses are held in a fixed relation to each other to form a lens assembly with a ray path through the lens assembly. As a result, the focal plane of the optical system is relatively stationary.

The lenses are typically fixed in position inside a lens housing. The lens housing serves as the structural element that holds the lenses. The lens housing also protects the lenses and prevents stray light from entering the optical system. However, the lens housing also increases the radial size of the optical system, which is undesirable in some circumstances where the optical system must fit within a tightly confined space.

The conventional approaches to fixing the lenses inside the lens housing include adhesive bonding of the lenses to the inner side wall of the lens housing and mechanical screw fittings that contact the lenses and hold them in position. Adhesive bonding has the advantage that the radial size of the lens housing need not be increased to accommodate the bonding, but it has the disadvantage that the adhesive may deform over time and apply stress to the bonded lenses that causes them to deform. Additionally, the available adhesives deform as a result of exposure to humidity and temperature changes, so that the relative position of the lenses changes and the ray path and focal plane are altered. Adhesive bonding is also difficult to perform for long lens assemblies that require a long, relatively small-diameter lens housing. Mechanical screw fittings require that the radial size of the lens housing be increased to provide for the male and female threads on the mating elements, which may render the optical system unusable for some applications. Mechanical screw fittings are also relatively expensive to produce. Other, more complex arrangements may be envisioned for specialized applications, but these complex arrangements are too costly for many applications.

There is a need for an approach to lens assemblies that holds the lenses in a well-defined, fixed relation in a lens housing, but does not require increasing the radial size of the housing. The present invention fulfills this need, and further provides related advantages.

SUMMARY OF THE INVENTION

The present invention provides a lens assembly and a method for its preparation. The lens assembly achieves the advantages of using a protective lens housing, but does not place undesirably large stresses on the lenses. Temperature, humidity, and other environmental effects on the optical performance of the lens assembly are minimized. The radial size of the housing is not increased over the minimum size required for the lenses and the wall thickness of the housing. The present approach is also relatively inexpensive to implement.

In accordance with the invention, a lens assembly comprises a lens housing having an inner side wall and hollow interior, wherein the lens housing is made of a lens-housing material; a first lens received in the hollow interior, wherein the first lens is not affixed to the inner side wall; and a second lens received in the hollow interior and axially spaced from the first lens, wherein the second lens is not affixed to the inner side wall. An annular first retainer is within the hollow interior and is disposed between and contacting the first lens and the second lens, wherein the first retainer is made of a first-retainer material. A first-retainer joint affixes the first retainer to the inner side wall of the housing. The first-retainer joint is made of a first-retainer joint material selected from the group consisting of the lens-housing material, the first-retainer material, and a solder. In one form, the inner side wall is cylindrical in shape, and the lenses and the first retainer are substantially cylindrically symmetric.

In one embodiment, the inner side wall of the housing includes a seat. The first lens has a first side and a second side. The first side of the first lens rests against the seat, and the first retainer contacts the second side of the first lens. The seat may be in the form of a step in the inner side wall, or another annular retainer affixed to the inner side wall.

The first-retainer joint material may be metallic or nonmetallic, but it is preferably comprises a metallic material that is stable under temperature changes and environmental effects such as humidity. The metallic form of the first-retainer joint material may be melted metal of the first retainer material, with the first-retainer joint formed by reflow of the material due to general or local heating. It may instead be melted lens-housing material or solder. In any case, where the first lens is contoured, the annular first retainer may be conformably contoured to a contacted portion of the first lens.

The principles of the present approach may be extended to the use of additional retainers and additional lenses. Thus, in one embodiment the second lens has a first side and a second side, the first retainer contacts the first side of the first lens, and the lens assembly further includes an annular second retainer contacting the second side of the second lens. A second-retainer joint affixes the second retainer to the inner side wall of the housing. Features discussed elsewhere herein may be utilized in relation to such extended forms.

A method for preparing a lens assembly comprises the steps of providing a lens housing having an inner side wall and a hollow interior, providing a first lens having a first side and a second side, placing the first lens into the interior of the lens housing, providing an annular first retainer, placing the annular first retainer into the interior of the lens housing contacting the second side of the first lens, and affixing the annular first retainer to the inner side wall with a first-retainer joint by an approach selected from the group consisting of soldering and welding. The first lens is not affixed to the inner side wall.

In the conventional approach of using an adhesive to affix the lenses to the inner side wall, the radial stresses resulting from the adhesive bonding may deform the lenses, particularly where the lenses are made of plastic rather than glass. In the present approach, the lenses are not themselves affixed to the inner side wall, but instead are placed into the lens housing alternating with the retainers. The retainers are affixed to the inner side wall, so that there is no stress loading directly onto the lenses. Any stresses in the lenses resulting from the retainers contacting the lenses are largely in the through-thickness direction (i.e., parallel to the optical axis) of the lenses at their radial peripheries, so that there is minimal deforming of the lenses either at the assembly temperature, or when the temperature is later changed.

The present approach does not require any increase in the radial size of the lens assembly over the basic requirements of the lenses and the barrel. The present approach is also relatively inexpensive to implement. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
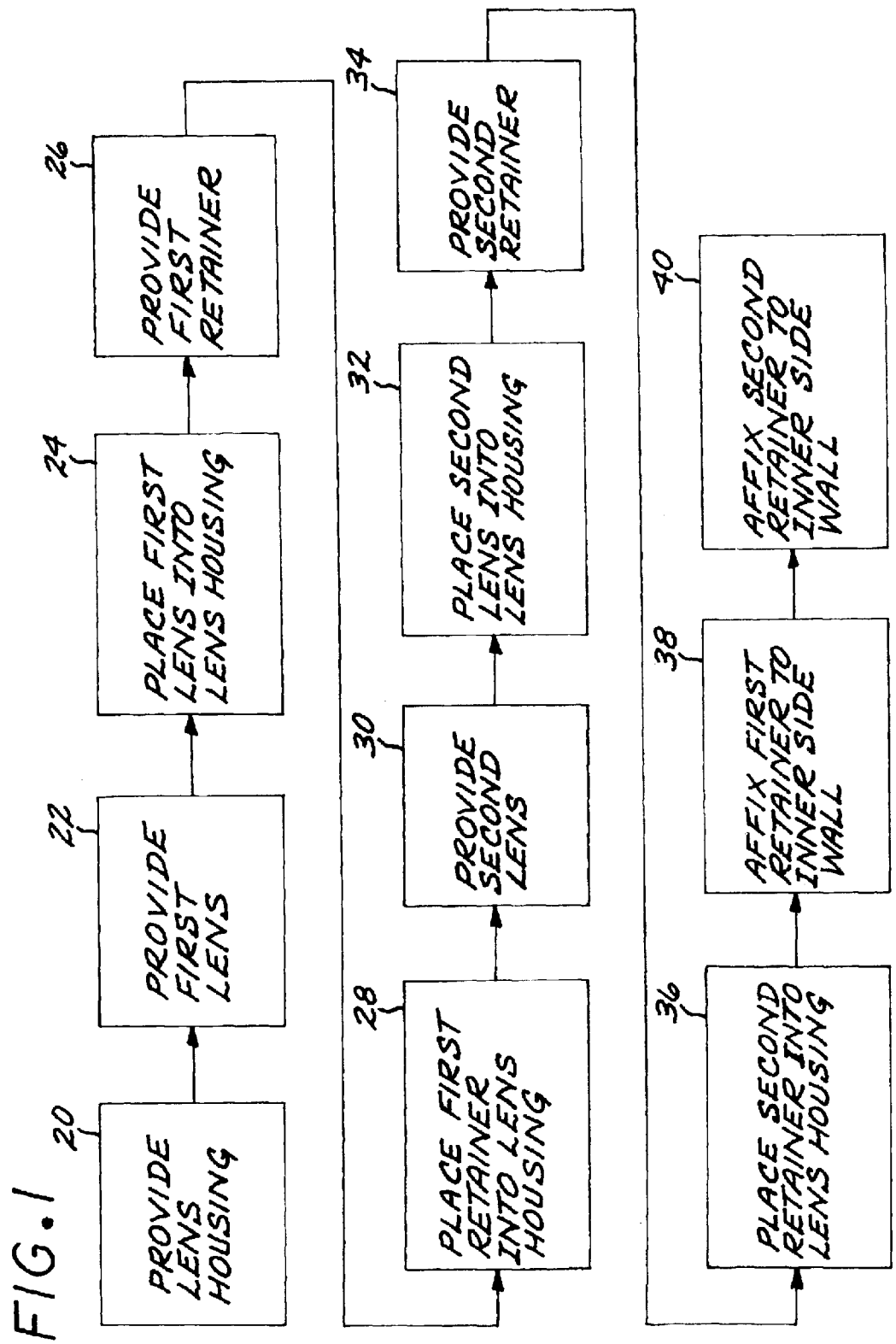
FIG. 1 is a block diagram of a method for practicing the invention.
Figure 2:
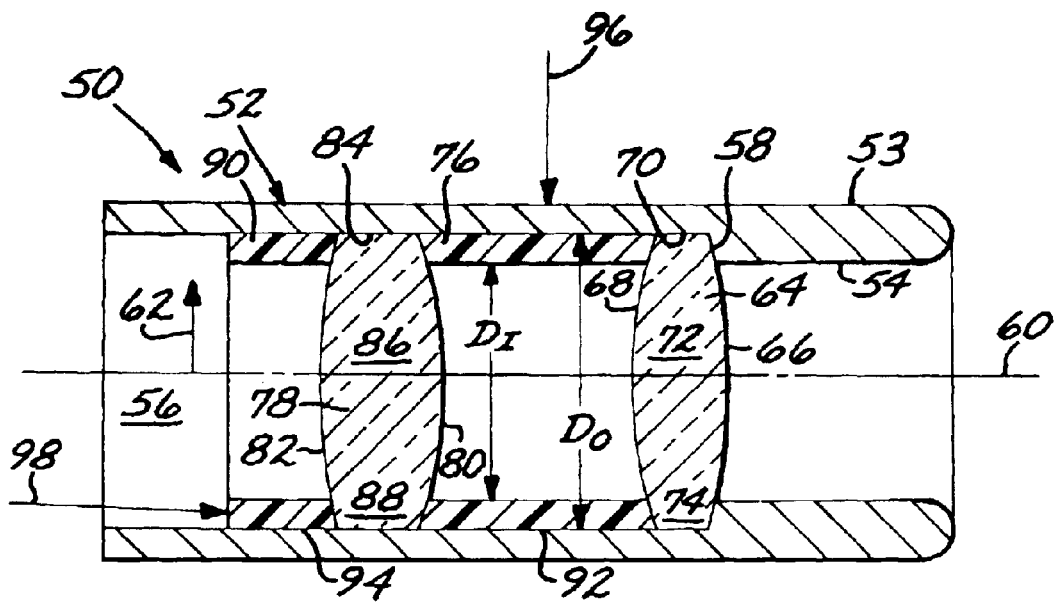
FIG. 2 is a first embodiment of a lens assembly.
Figure 3:
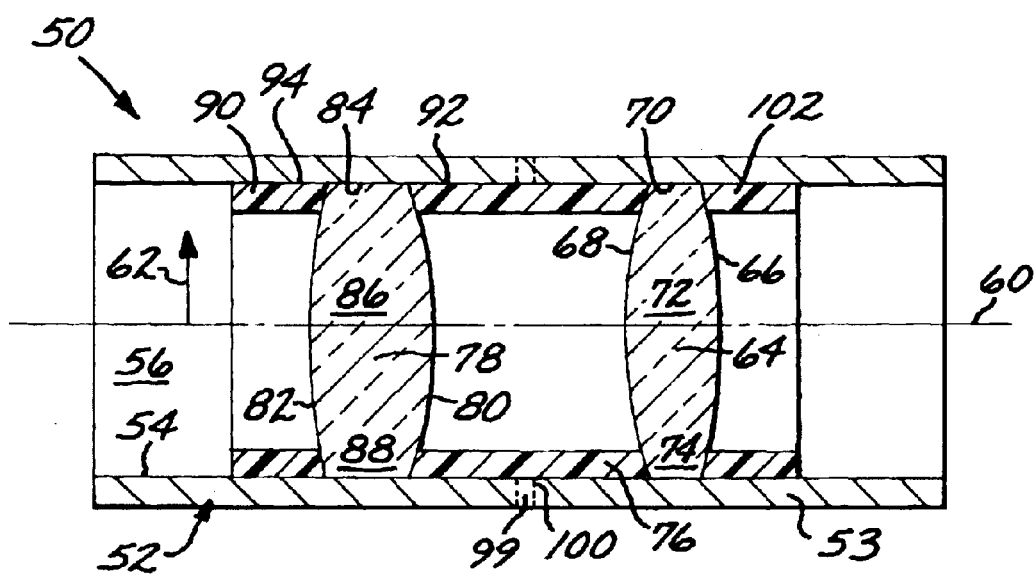
FIG. 3 is a second embodiment of the lens assembly.

FIG. 1 depicts a method of preparing a lens assembly 50, two embodiments of which are illustrated in FIGS. 2 and 3. The method comprises a step 20 of providing a lens housing 52 having a wall 53 with an inner side wall 54, and a hollow interior 56. The lens housing 52 may also have a seat 58 therein. The embodiment of FIG. 2 has a seat 58 in the form of a step in the wall 53 of the housing, and the embodiment of FIG. 3 has no seat in its wall 53 so that the inner side wall 54 is smooth. The lens housing 52 has a centerline 60 that also defines a light beam propagation axis for the lens assembly 50. The lens housing 52 may be made of any operable lens-housing material and have any operable dimension. Preferably but not necessarily, the lens housing material is a metal such as 304L stainless steel, kovar, or aluminum alloy, and is cylindrically symmetric about the centerline 60, which thereby becomes a cylindrical axis of the lens assembly 50. A radial direction 62 extends perpendicular to the axis 58.

A first lens 64 having a first side 66, a second side 68, and a radially outwardly facing periphery 70 is provided, step 22. The first lens 64 may be described as having a central portion 72 through which a light beam passes when the lens assembly 50 is in service, and a rim 74 through which the light beam does not pass when the lens assembly 50 is in service. The first lens 64 may be made of any operable material, such as glass or plastic for visible-light applications, or silicon for infrared applications. The first lens 64 may have any operable symmetry or lack of symmetry relative to the centerline 60. The first side 64 and the second side 66 may be of any operable shape.

The first lens 64 is placed into the interior 56 of the lens housing 50, step 24. In the embodiment of FIG. 2, the first lens 64 is seated with the rim 74 of the first side 66 contacted against the stepped seat 58. The first lens 64 is thereby precisely positioned relative to the seat 58.

An annular first retainer 76 is provided, step 26. The first retainer 76 is an annulus (ring) having an outer size (diameter $D_O$ in the case of a cylindrically symmetric lens housing 50) slightly less than the inner size of the inner side wall 54, and an inner size (diameter $D_1$ in the case of a cylindrically symmetric lens assembly 50) so that the first retainer 76 does not obscure the central portion 72 of the first lens 64. The length of the first retainer 76 measured parallel to the centerline 60 is selected to maintain the desired separation distance between the first lens 64 and a second lens to be discussed subsequently.

The first retainer 76 is made of a first-retainer material. The first-retainer material may be the same as the lens housing 52, or it may be a different material. The first-retainer material may be a metal. The first retainer material may instead be a nonmetal such as a polymer.

The annular first retainer 76 is placed into the interior 56 of the lens housing 52 contacting the second side 68 of the rim 74 of the first lens 64, step 28.

A second lens 78 having a first side 80, a second side 82, and a radially outwardly facing periphery 84 is provided, step 30. The second lens 78 may be described as having a central portion 86 through which light a light beam passes when the lens assembly 50 is in service, and a rim 88 through which the light beam does not pass when the lens assembly 50 is in service. The second lens 78 may be made of any operable material, such as glass or plastic for visible-light applications, or silicon for infrared applications. The second lens 78 may be made of the same material as the first lens 64, or a different material. The second lens 78 may have any operable symmetry or lack of symmetry relative to the centerline 60. The first side 80 and the second side 82 may be of any operable shape.

The second lens 78 is placed into the interior 56 of the lens housing 50, step 32. The first side 80 of the second lens 78 contacts the annular first retainer 76 so that the annular first retainer 76 is sandwiched between the first lens 64 and the second lens 78. The second lens 78 is thereby precisely positioned axially and radially relative to the first lens 64.

An annular second retainer 90 is optionally provided, step 34. The second retainer 90 is an annulus (ring) sized and shaped in a manner like that of the annular first retainer 76, whose discussion is incorporated here. The length of the second retainer 90 measured parallel to the centerline 60 may be any selected value. If there is yet another lens to the left of the second lens 78, the length of the second retainer 90 is selected to maintain the desired separation distance between the second lens 78 and the third lens.

The annular second retainer 90 may be made of any of the same types of materials as is the annular first retainer 76, and the prior description of the first retainer 76 is incorporated here. However, as will be discussed subsequently, the second retainer 90 may or may not be made of the same material as the first retainer 76.

The annular first retainer 90 is placed into the interior 56 of the lens housing 52 contacting the second side 82 of the rim 88 of the second lens 78, step 36.

The annular first retainer 76 is affixed to the inner side wall 54 of the lens housing 52 with a first-retainer joint 92 made of a first-retainer joint material, step 38. The annular second retainer 90 is affixed to the inner side wall 54 of the lens housing 52 with a second-retainer joint 94 made of a second-retainer joint material, step 40. Care is taken that the first lens 64 and the second lens 78 are not affixed or bonded to the inner side wall 54 of the lens housing 52. Alternatively, only the end-most retainer is fixed to the inner side wall 54. In this case of such an alternative approach, the annular second retainer 90 would be fixed to the inner side wall 54, and the annular first retainer 76 would not be fixed to the inner side wall 54 and could slide axially. That is, step 38 would be omitted.

The affixing steps 38 and 40 are illustrated as the last steps, but they need not be in this order or in this location in the preparation sequence. For example, the first-retainer affixing step 38 may occur after the first retainer 76 is placed into the lens housing 52 (step 28) and prior to placing the second lens 78 into the lens housing (step 32). The positioning of the steps 38 and 40 in the preparation sequence depends upon the manner of the affixing and considerations of production efficiency.

The manner of performing the affixings 38 and 40 depends upon the nature of the respecfive joints 92 and 94. The joints 92 and 94 may be of the same type, or they may be different. In either case, the respective annular retainer 76 and 90 may be affixed to the inner side wall 54 with a retainer-joint filler material such as a solder joint 92 and 94, respectively. (As used herein, "solder" encompasses materials that are sometimes considered solders and materials that are sometimes considered brazes. Although there may be differences in some situations, such is not the case here.) The retainer-joint material that forms the solder joint 92 or 94 is typically of a metal different from that which forms the respective annular retainer 76 or 90. Any operable solder (or braze) material may be used, with low-temperature solders such as conventional lead-tin solder being preferred.

In another approach, joining is of the non-filler welding type that does not use a filler material. In one embodiment, the retainer-joint material that forms the respective joint 92 or 94 is the melted constituent retainer material of the respective retainer 76 or 90. That is, the annular retainer 76 and/or 90 is heated locally or generally to a temperature at which there is some local melting of the retainer 76 and/or 90 at its respective periphery, a process termed "reflow". Upon cooling and resolidification of the melted material, the annular retainer 76 or 90 is bonded to the inner side wall 54 of the lens housing 52. In yet another approach, the retainer-joint material is the lens-housing material that forms the lens housing 52, which is reflowed to form the respective joint 92 or 94. The retainer material and the lens-housing material are preferably metals, but they may be nonmetals such as rigid plastics. A mixture of these various materials is also permitted, so that the retainer-joint material comprises more than one of the solder, the retainer material, and the lens-housing material.

In all of these cases, care is taken that the temperature required for soldering, or for reflow of the retainer material or the lens-housing material is less than any temperature at which the lens housing 52 or the respective retainer 76 or 90 is unacceptably weakened or distorted, and less than any temperature that does damage to the lenses 64 and 78.

The heating required for soldering or reflow of the retainer material or the lens-housing material may be supplied by generally heating the lens housing 52 and the elements therein, as in an oven. The heating may instead be required by locally heating the region to be heated and melted. In one approach, a laser beam 96 focused so that its energy provides the proper heating may be directed generally radially inwardly against an outside of the lens housing, see FIG. 2. The wall 53 of the lens housing 52 is heated, and by conduction the region to be melted is heated. A similarly focused laser beam 98 may be directed through the interior 56 of the lens housing 52, generally parallel to the centerline, directly against the region to be melted.

In another approach, a plug 99 of the solder may be placed into a port 100 that extends through the side wall 53 of the lens housing 52 at a location corresponding to the desired position of the respective retainer 76 (or 90), see FIG. 3. When the retainer is to be fixed in place in steps 38 or 40, the plug 99 is heated to melt the solder. The solder flows inwardly and, upon solidification, fixes the retainer in place.

FIG. 3 also illustrates a variation in the construction of the seat 58. In this case, instead of a stepped seat 58 in the side wall 53, as in FIG. 2, the seat 58 is made by providing and affixing an annular seat retainer 102 at the desired location of the seat 58. The seat retainer is constructed, made of materials, and affixed to the inner side wall 54 as discussed for the first retainer 76 and the second retainer 90. The prior discussion of such affixing techniques is incorporated here. By using the seat retainer 102 of FIG. 3 rather than the step seat as illustrated in FIG. 2, the inner side wall 54 may remain smooth and thin, and requires no interior machining.

An advantage of the present approach is that the first retainer 76, the second retainer 90, the step seat 58, and the seat retainer 102 may all be conformably contoured to conform to any curvature of the side of the rim portion of the respective lens that they face. This curving of the element 76, 90, 58, and/or 102 allows the element to contact the facing surface of the rim of the lens to spread the contact loads over a relatively large area. Point stresses on the lenses are thereby reduced or desirably avoided.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A lens assembly comprising:
   a lens housing having an inner side wall and hollow interior, wherein the lens housing is made of a metallic or nonmetallic lens-housing material;
   a first lens received in the hollow interior, wherein the first lens is not affixed to the inner side wall;
   a second lens received in the hollow interior and axially spaced from the first lens, wherein the second lens is not affixed to the inner side wall;
   an annular first retainer within the hollow interior and disposed between and contacting the first lens and the second lens, wherein the first retainer is made of a metallic or nonmetallic first-retainer material; and
   a first-retainer joint affixing the first retainer to the inner side wall of the housing, wherein the first-retainer joint is made of a metallic or nonmetallic first-retainer joint material selected from the group consisting of the metallic or nonmetallic lens-housing material, the metallic or nonmetallic first-retainer material, and a solder.

2. The lens assembly of claim 1, wherein
   the inner side wall of the housing includes a seat,
   the first lens has a first side and a second side,
   the first side of the first lens rests against the seat, and
   the first retainer contacts the second side of the first lens.

3. The lens assembly of claim 1, wherein
   the inner side wall of the housing includes a seat in a form of a step in the side wall,
   the first lens has a first side and a second side,
   the first side of the first lens rests against the seat, and
   the first retainer contacts the second side of the first lens.

4. The lens assembly of claim 1, wherein
   the second lens has a first side and a second side,
   the first retainer contacts the first side of the first lens, and
   the lens assembly further includes
      an annular second retainer contacting the second side of the second lens, and
      a second-retainer joint affixing the second retainer to the inner side wall of the housing.

5. The lens assembly of claim 1, wherein
   the inner side wall is substantially cylindrical,
   an outer periphery of the first lens is substantially cylindrical and in facing relation to the inner side wall, an outer periphery of the second lens is substantially cylindrical and in facing relation to the inner side wall, and the annular first retainer is substantially cylindrical.

6. The lens assembly of claim 1, wherein the first lens is contoured, and wherein the first retainer is conformably contoured to a contacted portion of the first lens.

7. The lens assembly of claim 1, wherein the first-retainer joint material comprises the lens-housing material.

8. The lens assembly of claim 1, wherein the first-retainer joint material comprises the first-retainer material.

9. The lens assembly of claim 1, wherein the first retainer is metallic, and wherein the first-retainer joint material comprises melted metal of the first retainer.

10. The lens assembly of claim 1, wherein the first-retainer joint material comprises the solder.

11. The lens assembly of claim 1, wherein the first-retainer joint material is a metallic material.

12. A method for preparing a lens assembly, comprising the steps of providing a lens housing having an inner side wall and a hollow interior;

providing a first lens having a first side and a second side;

placing the first lens into the interior of the lens housing;

providing an annular first retainer;

placing the annular first retainer into the interior of the lens housing contacting the second side of the first lens; and affixing the annular first retainer to the inner side wall with a first-retainer joint by an approach selected from the group consisting of soldering and welding, wherein the first lens is not affixed to the inner side wall.

13. The method of claim 12, wherein the step of providing the lens housing includes the step of providing the lens housing having a seat therein, and the step of placing the first lens into the interior of the lens housing includes the step of placing the first side of the first lens in contact with the seat.

14. The method of claim 12, wherein the step of affixing the annular first retainer includes the step of affixing the annular first retainer to the inner side wall by non-filler welding of the annular first retainer to the inner side wall.

15. The method of claim 12, wherein the step of affixing the annular first retainer includes the step of affixing the annular first retainer with a metallic material comprising melted metal of the first retainer.

16. A method for preparing a lens assembly, comprising the steps of providing a lens housing having an inner side wall and a hollow interior;

providing a first lens having a first side and a second side;

placing the first lens into the interior of the lens housing;

providing an annular first retainer;

placing the annular first retainer into the interior of the lens housing contacting the second side of the first lens;

providing a second lens having a first side and a second side;

placing the second lens into the interior of the lens housing with the first side of the second lens contacting the annular first retainer;

providing an annular second retainer;

placing the annular second retainer into the interior of the lens housing contacting the second side of the second lens;

affixing the annular first retainer to the inner side wall with a first-retainer joint by an approach selected from the group consisting of soldering and welding; and affixing the annular second retainer to the inner side wall with a second-retainer joint by an approach selected from the group consisting of soldering and welding, wherein the first lens and the second lens are not affixed to the inner side wall.

17. The method of claim 16, wherein the step of providing the lens housing includes the step of providing the lens housing having a seat therein, and the step of placing the first lens into the interior of the lens housing includes the step of placing the first side of the first lens in contact with the seat.

18. The method of claim 16, wherein the step of affixing the annular first retainer includes the step of affixing the annular first retainer with a metallic material.

19. The method of claim 16, wherein the step of affixing the annular first retainer includes the step of affixing the annular first retainer with a metallic material comprising melted metal of the first retainer.

* * * * *